July 30, 1929. J. S. MARTIN 1,722,758
MEANS FOR CORRECTING TEMPERATURE ERRORS IN ELECTRIC METERS
Filed Feb. 27, 1928 2 Sheets-Sheet 1
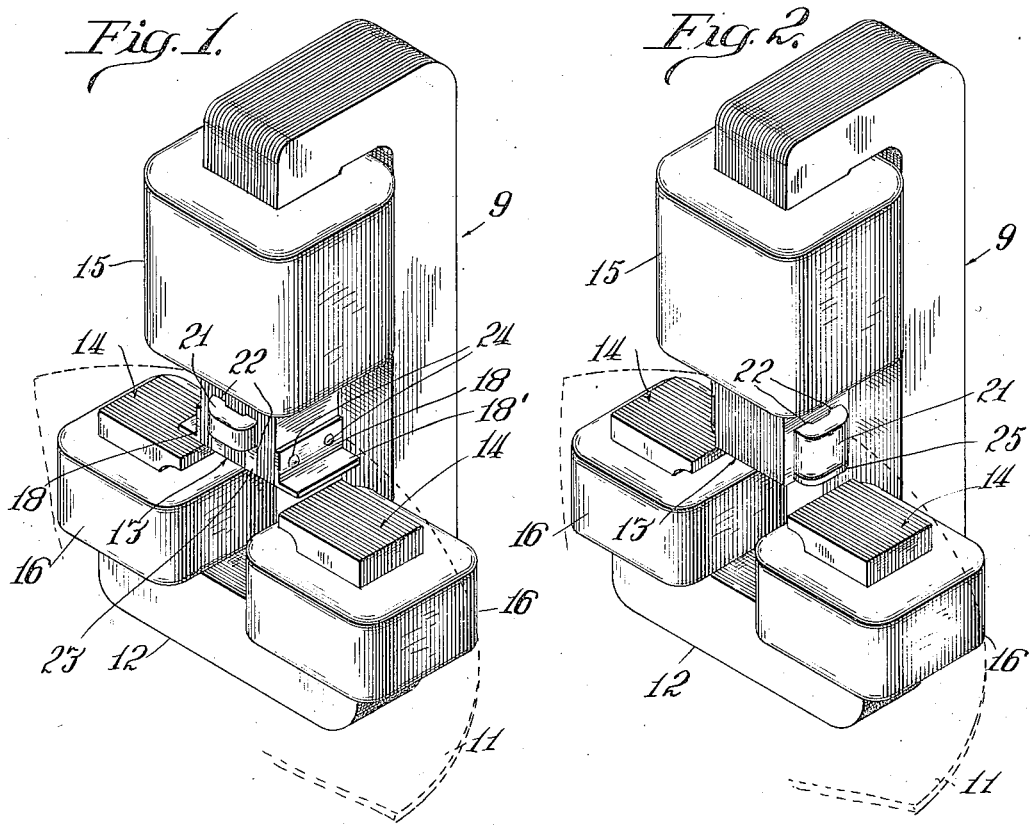
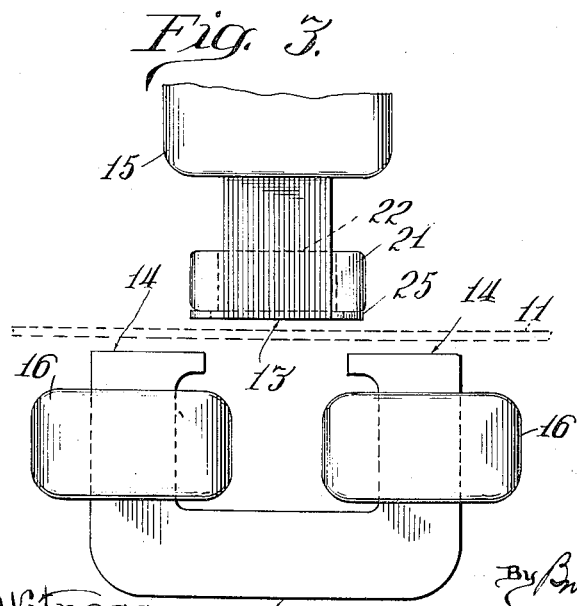
Inventor.
James S. Martin,
By Brown, Jackson, Boettcher & Dienner,
Attorneys
Witness
Milton Lenoir July 30, 1929.  J. S. MARTIN  1,722,758
MEANS FOR CORRECTING TEMPERATURE ERRORS IN ELECTRIC METERS
Filed Feb. 27, 1928   2 Sheets-Sheet 2
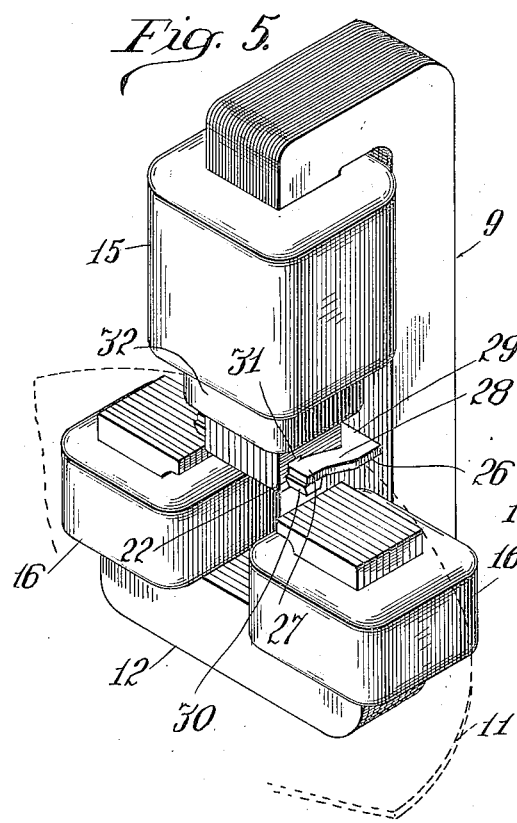
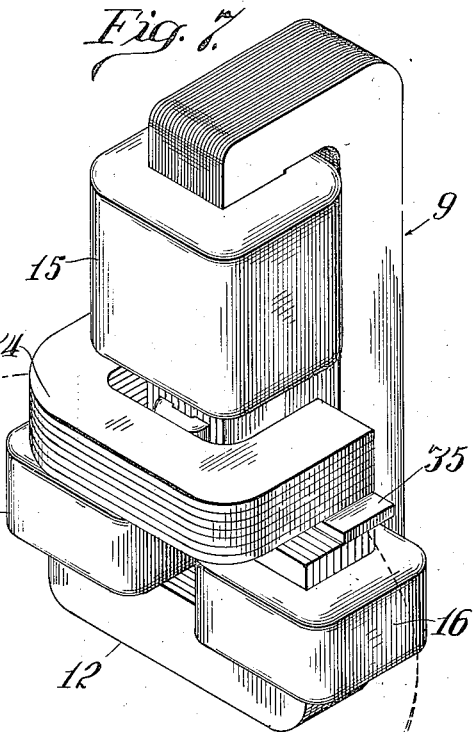
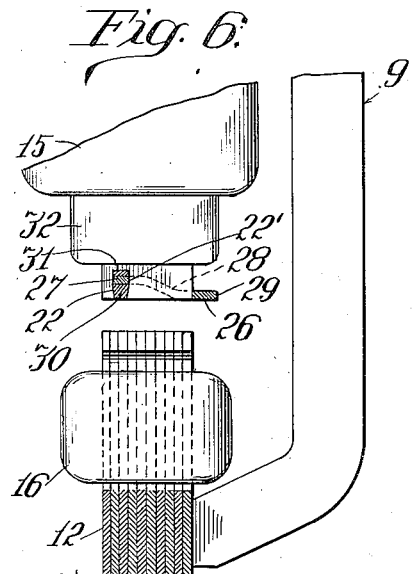
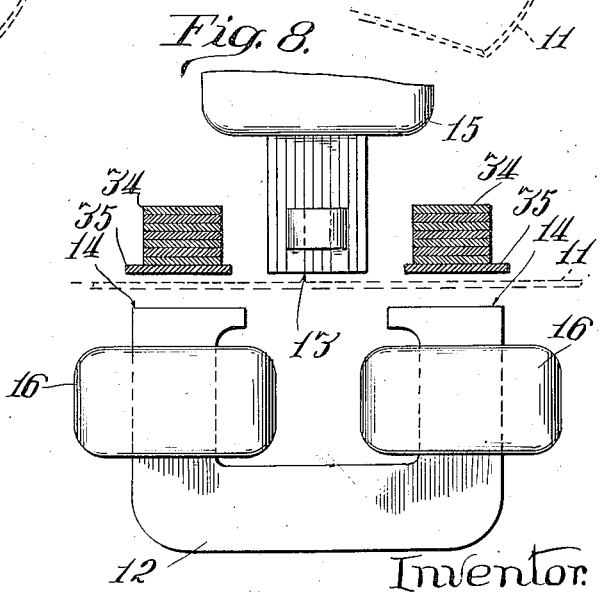

Patented July 30, 1929.

1,722,758

UNITED STATES PATENT OFFICE.

JAMES S. MARTIN, OF SPRINGFIELD, ILLINOIS, ASSIGNOR TO SANGAMO ELECTRIC COMPANY, OF SPRINGFIELD, ILLINOIS, A CORPORATION OF ILLINOIS.

MEANS FOR CORRECTING TEMPERATURE ERRORS IN ELECTRIC METERS.

Application filed February 27, 1928. Serial No. 257,212.

The present invention pertains to the correction of temperature errors in electric meters, and has particular reference to the correction of such errors in alternating current meters of the induction type. It is often necessary to install meters in locations where they are subjected to wide variations of temperature or to a continued abnormal temperature, and the average induction type of watthour meter will under these conditions show an appreciable error arising entirely from the influences of temperature on the meter. For example, in an outdoor installation, such as on a transformer pole or the like, the seasonal temperature variation may exceed 100° F., and in indoor installations, such as near boilers, refrigerating apparatus, etc., the meter may be subjected to considerable temperature variations or to a sustained abnormal temperature.

One of the particular objects of the invention is to provide an improved method of correcting temperature errors by exerting the corrective influence on the meter through variation of the driving torque acting on the rotor of the meter. When the ordinary watthour meter is operating at unity power factor under a given load, an increase of temperature has the tendency to cause the rotor to revolve at a higher speed, thereby causing an error in the registration of the meter. This change of registration has apparently for its primary cause the change in temperature of the permanent magnets and the structural parts of the meter. The methods and means heretofore employed for the purpose of correcting this temperature error at unity power factor have been directed to the establishment of a corrective influence on the permanent magnet field. For example, one practice has been to associate with the permanent magnets certain types of shunts composed of alloys, the magnetic properties of which are functions of the temperature. With an increase of temperature, these shunts function to increase the flux of the damping magnets cutting the rotor of the meter, thereby to compensate for the tendency of the meter to speed up with an increase of temperature.

The present method of temperature compensation is a radical departure from these prior methods in that it is directed to exercising the corrective influence on the meter through the driving torque which is exerted on the rotor thereof instead of exercising this corrective influence through the damping flux of the permanent magnets. More specifically, the invention contemplates varying the active series flux as a function of the temperature, i. e., associating with the series magnetic circuit a certain temperature responsive device or devices which will diminish the series flux cutting the meter disc with an increase of temperature. Preferably such temperature responsive means is included in the series magnetic circuit and is composed of an alloy, the magnetic permeability of which decreases with increased temperature, so that the reluctance of the series magnetic circuit increases with increased temperature.

Another object of the invention is to associate this temperature responsive means with other means which will be efficacious to correct temperature errors at power factors other than unity. The first mentioned temperature responsive means is particularly efficacious for correcting temperature errors at unity power factor, and the second mentioned means cooperates therewith to the end of correcting temperature errors when the meter circuit is operating at a lagging power factor. Thus compensation is provided for under all of the line conditions under which the meter will ordinarily operate.

In the following detailed description I have set forth the preferred manner of carrying out my invention, and in such description other objects and advantages of the invention will appear. In the drawings accompanying this description:

Fig. 1 is a fragmentary perspective view, somewhat diagrammatic in character, showing one form of my invention.

Fig. 2 is a similar fragmentary view showing another form of the invention.

Fig. 3 is a front elevational view of the latter form.

Fig. 4 is a detail view of the link employed in the embodiment shown in Figs. 2 and 3.

Fig. 5 is a perspective view of another modified construction.

Fig. 6 is a side view of the same, illustrating the series element and the compensating key in section; and Figs. 7 and 8 are perspective and vertical sectional views respectively of another modification.

Fig. 1 illustrates a typical assembly of the voltage and current elements of a standard type of induction meter. The voltage element 9 comprises a C-shaped magnet structure having its downwardly extending leg disposed in close proximity to the rotating disc 11. The other end or leg of the voltage magnet is secured to the side of the current or series element 12. The latter comprises a U-shaped magnet structure which is disposed below the rotating disc 11. The downwardly extending leg of the voltage element 9 constitutes a pole face 13 which is disposed in close proximity to the disc and the upwardly extending legs of the current element 12 form pole faces 14 which are also disposed in close proximity to the under side of the rotating disc, the latter pole faces being usually spaced or offset laterally slightly with respect to the pole face 13. The voltage coil 15 is mounted on the downwardly extending leg of the shunt core 9, and the two series coils 16, 16 are mounted on the two legs of the series core 12.

The foregoing represents a typical construction of induction meter to which my invention has application, it being understood, however, that such construction is merely exemplary and that the invention also has application to other forms of induction meters. As is well known, the interaction of the field produced by the shunt coil 15 with the field produced by the series coils 16 sets up a rotative force in the rotor disc 11 for revolving the latter at a speed substantially proportional to the watt load on the line. The rotation of the disc 11 is usually damped by one or two permanent magnets, not shown, which establish a field which is cut by the disc, the flux of such field and the eddy currents produced thereby in the disc serving to retard the speed of the disc. It is customary to mount a compensating coil on the pole portion of the shunt core 9 below the shunt winding 15, the purpose of which compensating coil is to bring the magnetic flux of the shunt element in exact quadrature with the electromotive force impressed on the winding 15. Such compensating coil will be hereinafter described in referring to the method of and means for correcting temperatures at power factors other than unity.

For correcting temperature errors at unity power factor I associate with the series magnetic circuit certain devices which operate to increase the reluctance of said magnetic circuit with increased temperature, thereby to compensate for the tendency of the meter to revolve at a higher speed with increased temperature at this power factor. In the construction shown in Fig. 1, this compensating means comprises pole face extensions secured to the pole tip 13 of the shunt core 9 and serving to regulate, in accordance with temperature changes, the amount of series flux passing into the pole tip 13. Such extensions are preferably constructed in the form of small angle brackets 18 which are riveted or otherwise secured to the sides of the pole tip 13, and have flanges 18' projecting laterally from the sides of the pole tip a short distance. These extensions are composed of a material having a characteristic magnetic permeability which decreases with an increase of temperature, over the usual range of temperature to which the meter would be subjected. I have found that certain copper nickel alloys are entirely satisfactory as materials from which to construct these temperature responsive extensions. The copper nickel alloy commonly known as Monel metal represents one such alloy. At comparatively low or moderate temperatures, such extensions possess a relatively high permeability so that the meter registration is maintained accurate for these lower temperatures. With increasing temperature the permeability of such extensions decreases as a function of the temperature so that the reluctance of the series magnetic circuit is increased with a consequent diminution of the driving torque effective on the rotor 11, thereby compensating for the tendency of the rotor to revolve at a higher speed with increased temperature. By suitable choice of the dimensions and the magnetic properties of the alloy extensions 18, the reluctance of the series magnetic circuit can be made to vary by substantially the correct amount with change of temperature to maintain an accurate registration of the meter at unity power factor. It is customary to provide the above type of meter with a return plate of U-shaped form having its arms or pole extremities disposed over the pole faces 14 of the series core on the upper side of the disc, 11. I have omitted the showing of this return plate in Fig. 1 to avoid confusing the illustration. It will be understood that the inner sides of the arms of such return plate will be suitably spaced from the projecting flanges 18', or the arms of this return plate may be disposed in a plane above the flanges 18'. It will also be understood that the pole extensions 18 might be mounted on the other sides of the pole 13 so as not to interfere with the arms of the return plate. Another contemplated construction is to form the extensions in a single unit, preferably constructed as a rectangular washer or ring extending around all sides of the pole tip 13. As previously remarked, the above described compensating means is most efficient for correcting temperature errors at unity power factor. For compensating the meter at power factors other than unity, and particularly lagging power factors, I associate with the above mentioned compensating means a certain secondary temperature responsive means which cooperates with the compensating or lag coil on the pole tip 13 of the shunt core. Such secondary method of compensation for lagging power factors is disclosed in the copending application of Fred Kurz, Serial No. 147,873 filed November 12, 1926, and comprises varying the reactance of the compensating coil by inserting thermo responsive elements in the magnetic path of the coil, which elements reduce the reactance of the coil by decreasing the permeability of its flux path with an increase in temperature. Such construction is shown in Fig. 1, wherein the compensating coil 21 is recessed in two slot-like openings 22 extending upwardly in substantially parallel relation from the lower end of the pole tip 13. Where such openings are disposed in the plane of the laminations of the core 9, said openings are preferably formed by making certain of the laminations shorter than the others to provide the two parallel slots or recesses for receiving the side portions of the coil. After forcing the coil or band 21 up into position in these openings, the remaining space below the coil in each opening is completely filled by driving into place two rectangularly shaped inserts 23, 23 and finally securing the entire assembly together by means of the transversely extending rivets 24. These rectangularly shaped inserts 23 represent the aforementioned thermo responsive elements of the Kurz application above noted. In the present construction the rivets 24 may be extended through the vertical flanges of the present compensating extensions 18, whereby they also serve to secure said extensions to the pole tip. The intermediate laminations of the core 9 extending down through the center of the coil 21 form a central core or tongue for said coil so that the latter has a substantially closed magnetic circuit consisting of the iron laminations and the rectangular inserts 23. The magnetic properties of these inserts are such that the permeability thereof decreases with an increase in temperature, over the usual range of temperature to which the meter would be subjected. By suitable choice of dimensions and the magnetic properties of the alloy inserts 23, the reactance of the coil 21 is made to vary by substantially the correct amount to obtain proper temperature compensation at the lagging power factors. In explanation of this secondary temperature compensation, the purpose of the coil 21 is to bring the flux from the tip of the voltage element 9 into exact quadrature with the voltage applied to the winding 15; and, in general, the magnitude of the compensation of such coil will depend upon the resistance of the voltage element and the various losses. The compensating coil 21 has an inherent resistance, and the amount of compensation exerted thereby is hence affected by changes in temperature. An increase in temperature of the meter generally increases the resistance of both the voltage coil 15 and the compensating or lag coil 21. An increase in the resistance of the voltage coil 15 generally calls for increased compensation from the lag coil 21, but in ordinary meter construction the compensation actually falls off because of the increase in resistance of the coil 21. The registration of the meter at lagging power factors, therefore, ordinarily falls off with increasing temperature. However, by the provision of the alloy inserts 23 in controlling relation with respect to the coil 21, the reactance of such coil is caused to decrease with an increase of temperature so that the increasing resistance of the coil is offset or compensated by the decreased reactance thereof. Hence the meter is compensated for temperature errors at unity power factor, and also for temperature errors at lagging power factors.

The construction shown in Figs 2, 3 and 4 differs principally from the construction shown in Fig. 1 in that the pole tip extensions which effect temperature compensation at unity power factor, and the alloy inserts which have the same function at lagging power factors, are embodied in one and the same element. In such construction the slots 22 for receiving the compensating coil 21 extend substantially parallel with the plane of the series core 12. After the compensating coil 21 has been forced up into these slots a long closed link 25 is forced into the lower ends of the slots below the coil. Such link is illustrated in Fig. 4. The side portions of the link bridge the slots 22 below the coil, thereby taking the place of the alloy inserts 23 of Fig. 1. The end portions of said link project laterally beyond the sides of the pole 13, so that such end portions of the link take the place of the pole extensions 18 of Fig. 1. Such link is also composed of an alloy, the permeability of which decreases with increased temperature so that it performs the dual function of decreasing the permeability of the series magnetic circuit and decreasing the reactance of the coil 21, with an increase in temperature. While it is preferable that the element 25 be constructed in the form of a closed loop or link, such is not essential as it may be constructed in the form of two parallel bars or strips having their ends separated.

The modified construction shown in Figs. 5 and 6 is similar in some respects to the construction shown in Fig. 2. In Figs. 5 and 6 only one slot 22 is cut through the pole tip, and such slot is tapered or wedge-shaped to lock the compensating element in place, as will presently appear. In such construction a closed rectangular loop or band 26 embraces part of the potential pole and has one side portion engaging in the slot 22. It will be noted from Fig. 6 that the two side portions of such loop or band are disposed in different planes. The upper side portion 27 is made sufficiently narrow to permit it to be passed up through the narrow bottom of the slot 22. Such portion of the compensating link fits snugly in a parallel-sided slot 22′ which extends upwardly from the wedge-shaped slot 22. The end portions 28 of the loop or band 26 are shown as being curved downwardly to dispose the other side portion 29 thereof substantially flush with the lower face of the pole tip 13. Said loop or band is held in place in the slot 22 by a wedge-shaped key 30 which is driven into the wedge-shaped slot 22 from one end thereof, below the side portion 27 of the loop. In adapting this construction to different voltages of frequencies it may be desirable to employ loops 26 of different thicknesses. When a loop of reduced thickness is employed a filler strip 31 of brass or the like may be interposed between the top of the slot 22′ and the side portion 27 of the loop, as best shown in Fig. 6.

The loop or band 26 is composed of copper or brass, depending upon requirements, and functions as a winding. The wedge-shaped key 30 is composed of a temperature sensitive alloy, such as a copper nickel alloy as I have previously described. One or both ends of the key 30 are extended beyond the side or sides of the pole tip 13, as shown in Fig. 5, so that such end or ends serve as pole extensions through which a portion of the series flux passes. The operation is generally similar to that of the construction shown in Figs. 2 and 3. That portion of the key engaging in the slot 22 functions as a temperature responsive insert for varying the reactance of the loop or band 26. Those portions of the key which project outwardly from the sides of the pole function as pole extensions characterized by a permeability which decreases with increased temperature, so that the reluctance of the series magnetic circuit is caused to increase with increased temperature. Thus the arrangement of the key 30 and its properties gives temperature compensation at unity and lagging power factors. The coil 32 which is shown as being mounted on the potential pole above the loop 26 is preferably provided for the purpose of making final adjustments in the meter.

The construction shown in Figs. 7 and 8 differs from the previously described constructions in that the means for compensating at unity power factor exerts its corrective influence on that portion of the series flux which passes through the return plate. Such return plate is indicated at 34. Secured to the side portions thereof are extensions 35 which project laterally from the return plate and overlie the series pole faces 14 above the meter disc 11. These extensions are also composed of a material having a permeability which decreases with increased temperature, similarly to the compensating elements 18, 25 and 30 of the preceding constructions. The construction shown in Fig. 7 operates similarly to the construction shown in Fig. 1 in that the series flux cutting the disc is caused to diminish with an increase in temperature, the principal difference being that the construction shown in Fig. 7 diminishes that portion of the series flux which passes through the return plate 34. When temperature compensation at unity power factor is thus effected by modifying the flux passing through the return plate, temperature compensation at lagging power factors is preferably effected by the arrangement of the compensating coil and cooperating inserts of the construction shown in Fig. 1.

I claim:

1. An electric meter of the induction type comprising a rotor, series and shunt magnetic circuits for establishing a driving torque in said rotor, temperature compensating means for varying the reluctance of the series magnetic circuit as a function of the temperature and temperature compensated means for maintaining the flux in said shunt magnetic circuit in quadrature to the flux of the series circuit.

2. An electric meter of the induction type comprising a rotor, series and shunt elements for establishing a driving torque in said rotor, means for varying the magnetic reluctance of said series element in accordance with temperature changes, compensating means for maintaining quadrature relation of the flux in said shunt element, and means for varying the reactance of said compensating means in accordance with temperature changes.

3. An electric meter of the induction type comprising a rotor, series and shunt magnetic circuits establishing a driving torque in said rotor, said shunt magnetic circuit comprising a voltage winding, a lag coil cooperating with said winding, and means for varying the reluctance of said series magnetic circuit and for varying the reactance of said lag coil in accordance with temperature changes.

4. In an electric meter of the induction type comprising a rotor, a series magnetic means and a shunt magnetic means for establishing a driving torque in said rotor, a compensating means acting on the flux produced by said shunt means to a degree varied as a function of temperature to compensate said meter for low power factors at all temperatures, and a compensating means controlling the flux produced by said series means to a degree varied as a function of temperature to compensate said meter for temperature variations.

5. An electric meter of the induction type comprising a rotor, series and shunt elements establishing a driving torque in said rotor, said shunt element comprising a voltage winding, a lag coil cooperating with said winding, and means stationarily mounted on said shunt element for varying the reluctance of said series element and for varying the reactance of said lag coil in accordance with temperature changes.

6. An electric meter of the induction type comprising a rotor, series and shunt elements establishing a driving torque in said rotor, said shunt element comprising a voltage winding, a lag coil cooperating with said winding, and means establishing a substantially closed magnetic circuit for said lag coil comprising a material having a permeability which decreases with an increase in temperature and so arranged as to vary the reluctance of said series element and to vary the reactance of said lag coil with temperature changes.

7. An electric meter of the induction type comprising a rotor, a shunt core disposed at one side of said rotor, a series core disposed on the other side thereof, a voltage winding on said shunt core, a compensating coil normally supported in stationary relation to said winding, and means stationarily mounted on said shunt core and establishing a substantially closed magnetic circuit for said compensating coil linking with the magnetic circuit of said shunt core, said means comprising a material having a permeability which decreases with an increase in temperature and so arranged that with an increase in temperature the reluctance of the magnetic circuit of said series element is increased and the reactance of said compensating coil is decreased.

8. An electric meter of the induction type comprising a rotor, a laminated potential core terminating in a pole face in the proximity to said rotor, said pole face having a slot cut therein extending transversely of the laminations, a loop member having one side thereof disposed in said slot and another side thereof disposed substantially flush with said pole face, and an insert closing said slot below said loop member, said insert being composed of a material the permeability of which decreases with an increase in temperature.

9. An electric meter of the induction type comprising a rotor, a laminated potential core terminating in a pole face in proximity to said rotor, said pole face having a slot cut therein extending transversely of the laminations, a loop member having one side thereof disposed substantially flush with said pole face, and an insert closing said slot below said loop member and having end portions extending beyond the sides of said core, said insert being composed of a material the permeability of which decreases with an increase in temperature.

10. An electric meter of the induction type comprising a rotor, a laminated potential core terminating in a pole face in proximity to said rotor, said pole face having a slot cut therein, a loop member engaging in said slot and an insert substantially closing said slot below said loop member and having end portions extending beyond the sides of said core, said insert being composed of a material the permeability of which decreases with an increase in temperature.

In witness whereof, I hereunto subscribe my name this 18th day of February, 1928.

JAMES S. MARTIN.